United States Patent [19]

Jacobs

[11] 3,944,123

[45] Mar. 16, 1976

[54] SOLDERING FLUX

[76] Inventor: Norman L. Jacobs, 108 Addison House, Grove End Road, St. John's Wood London N.W.8, England

[22] Filed: Sept. 10, 1974

[21] Appl. No.: 504,485

[52] U.S. Cl. ............... 228/223; 106/219; 106/243; 148/23; 148/25
[51] Int. Cl.$^2$ ........................................ B23K 31/02
[58] Field of Search ............................. 148/23–25; 29/495; 106/219; 228/223

[56] References Cited
UNITED STATES PATENTS

| | | | |
|---|---|---|---|
| 1,208,799 | 12/1916 | Kriews | 148/25 |
| 2,361,867 | 10/1944 | Pessel | 148/25 |
| 2,658,846 | 11/1953 | De Rosa | 148/25 |
| 2,674,554 | 4/1954 | Snell | 148/25 |
| 2,774,137 | 12/1956 | Yarow | 29/495 |
| 2,845,700 | 8/1958 | Bagno | 29/495 |
| 3,223,635 | 12/1965 | Dwyer | 252/56 R |
| 3,640,860 | 2/1972 | Miller | 164/73 |

*Primary Examiner*—Theodore Morris
*Attorney, Agent, or Firm*—Lawrence Rosen; E. Janet Berry

[57] ABSTRACT

Dimerised and trimerised unsaturated aliphatic monocarboxylic acids having at least 10 carbon atoms are advantageous in or as fluxes for soldering of tin plate. Especially valuable novel fluxes for this purpose comprise, in free acid or ammonium or amine salt form, (1) at least one compound selected from the group consisting of $C_{7-11}$ aliphatic monocarboxylic acids and acid organic phosphates and (2) at least one substance selected from the group consisting of dimerised and trimerised unsaturated aliphatic monocarboxylic acids having at least 10 carbon atoms, saturated $C_{12-36}$ aliphatic monocarboxylic acids and rosin.

5 Claims, No Drawings

SOLDERING FLUX

Tin plate i.e. steel having a plating of tin is used on a large scale, especially in making so-called tin cans. Such cans have seams and conventionally these are formed by soldering. Likewise, tabs or keys may be attached to the cans by soldering. In these operations a soldering flux is needed and because of the scale on which tin cans are made, and thus the speed at which it is desirable to make them, it is desirable that the flux used should be very reliable and rapidly acting.

The fluxes now used in making tin cans are not as reliable or as rapidly acting as would be desirable. Such fluxes, i.e. ones based on oleic acid, although they may work fairly well with one particular type of tin plate may not be satisfactory with other types of tin plate. With the increasing use of less good qualities of tin plate e.g. qualities having relatively thin tin layers this problem is becoming more serious. The problem is aggravated if the tin plate surface has become oxidised or mechanically damaged, e.g. scratched, or it there has been loss of free tin and growth of $Fe Sn_2$ during stoving of print-work. Other adverse factors include the presence of lacquer film or printing in seam areas and tin layers of varying temper, stiffness or thickness.

Because of the speed at which can-making machinery works, an inadequate flux may give rise to a large number of defective or suspect products before the fault is noticed and corrective action taken. Accordingly, an inadequate flux is liable to cause a considerable waste of materials and serious loss of production time through disruption of the continuous, highspeed, automated, multi-stage process involved in can-making.

I have now found that certain very specific materials are advantageous in or as fluxes for soldering tin plate. According to one aspect of the present invention, in soldering tin plate a flux is used that comprises a dimerised and/or a trimerised unsaturated, long-chain, aliphatic, carboxylic acid.

The monomeric acid corresponding to the dimerised or trimerised acid contains at least 8, preferably at least 12, e.g. at least 14, carbon atoms and thus the dimerised and trimerised acids contain at least 20 or 30, preferably at least 24 or 36, carbon atoms respectively. Such dimerised and trimerised acids are commercially available from Unilever-Emery N.V. Dimerised oleic acid and trimerised oleic acid are the preferred dimerised and trimerised oleic acids and, in general, the dimerised acids are preferred. Empol 1022 is an example of a dimerised oleic acid commercially available from the above source while Empol 1043 is an example of a trimerised oleic acid commercially available from the above source. Mixtures of either dimerised or trimerised acids may be used as may mixtures of acids of both these types. The commercially available dimerised acids usually contain a minor proportion, e.g. 3 to 22%, of the corresponding monomeric acid. Likewise, the commercially available trimerised acids usually contain a minor proportion of the corresponding dimerised acids, e.g. 5 to 24%, and often contain a minor proportion, e.g. up to 5%, of the corresponding monomeric acid.

The exact structure of the dimerised and trimerised acids is not known but these acids are known to be long-chain, di- and tri-carboxylic acids respectively, having at least 2 or at least 3 alkyl side chains respectively. The acids behave as if they contain ethylenic unsaturation and catalytic hydrogenation can be effected with heat and pressure.

If the sole active component is a dimerised and/or trimerised acid, the chief use of the fluxes is in direct flame soldering e.g. of tabs or keys to cans. However such fluxes are also usable in soldering seams of cans of high quality tin plate although in this case the fluxes desirably contain a major proportion of a solvent or solvents. In the case of direct flame soldering it is desirable that the flux should have relatively high thermal stability and thus the dimerised and trimerised acids used in this situation preferably have a low degree of unsaturation, particularly in side chains, since I have found that such acids have a greater thermal stability than that of the more unsaturated acids. Normally the acids have an iodine value of less than 100 but, when high thermal stability is desired, it is preferred that the acids should have been hydrogenated to such an extent that they have iodine values less than 25, more preferably less than 15.

According to a further aspect of the invention a flux comprises a dimerised and/or a trimerised acid as defined above and a Versatic acid. I have found that such fluxes are particularly reliable and rapidly acting fluxes for soldering tin plate. The fluxes can be used satisfactorily even with poor quality tin plate as long as a small amount of free tin is present on the surface: this applies not only to ordinary tin plate but, also to 'passivated' varieties. By "Versatic acid" is meant an acid or mixture of acids corresponding to the general formula $CR_1R_2R_3.CO_2H$ in which there is a total of 9 to 11 carbon atoms and each R is an alkyl group, at least one of these being methyl. Such a material is commercially available from Shell Chemical Company under the name 'Versatic Acid 911' or "Versatic Acid 10".

In the above fluxes one or more straight chain, saturated or unsaturated, aliphatic monocarboxylic acids containing 7 to 11 carbon atoms can be used in addition to, or to replace some or all of, the Versatic acid but it is preferred to use a Versatic acid alone. Examples of acids of this type are decanoic acid and 3,5,5-trimethylhexanoic acid. Likewise, some or all of the Versatic acid can be replaced or supplemented by one or more other branched chain saturated aliphatic monocarboxylic acids containing 7 to 11 carbon atoms and the corresponding unsaturated acids can be used similarly. Similarly, some or all of the Versatic acid can be replaced or supplemented by one or more organic acid phosphates, in which the organic groups generally contain up to 18 carbon atoms, such as an aryl or alkyl acid phosphate, preferably a lower alkyl acid phosphate e.g. butyl acid phosphate and other alkyl acid phosphates in which the alkyl group contains up to 6 carbon atoms. Furthermore, the fluxes may additionally contain one or more aliphatic or alicyclic dicarboxylic acids e.g. succinic acid, azelaic acid, sebacic acid, fumaric acid and hydrophthalic acid. These acids may be used as their half-esters e.g. mono-lower alkyl esters. Any acid used to replace or supplement the Versatic acid preferably has a boiling or sublimation point in the range of 275° to 375°C.

The above fluxes may also be modified by replacing or supplementing some or all of the dimerised and/or trimerised acid by rosin or by one or more straight or branched chain, saturated $C_{12}$-$C_{36}$ aliphatic monocarboxylic acids preferably containing at least 16 but preferably not more than 22 carbon atoms e.g. stearic acid, isostearic acid and 5,7,7-trimethyl-2(1,3,3-trimethylbutyl) octanoic acid.

Preferred fluxes according to the invention comprise a dimerised and/or a trimerised acid as defined above, the dimerised acids being preferred, and a Versatic acid, with or without an organic acid phosphate and/or a higher aliphatic dicarboxylic acid.

The acid value of the mixture of all the acids in the fluxes is preferably in the range of 250 to 400, preferably not greater than 300.

Some or all of the various acids which may be present in the fluxes may be used in the form of their ammonium or amine salts. This can be useful if a flux is desired which is substantially non-corrosive at room temperature or if it is desired to incorporate the acids in an aqueous and/or alcohol-containing medium. If the fluxes are to be used in the form of aqueous compositions it is generally desirable to include an emulsifying agent e.g. a non-ionic emulsifier.

It is usually desirable that the fluxes should be homogeneous liquids and this presents no particular problems. The Versatic acids and the dimerised and trimerised acids are liquids which are miscible with each other. Likewise, alkyl acid phosphates such as butyl acid phosphate are liquids miscible both with the Versatic acid and the dimerised and trimerised acids. Certain of the components mentioned e.g. decanoic, succinic, sebacic and azelaic acids are solids and if these are used in proportions such that they are not soluble in the liquid components solvents are desirable. Suitable solvents include lower alkanols, such as ethanol e.g. in the form of methylated spirits and isopropyl alcohol, the latter being preferred, and lower alkyl amines such as diethylamine and monoisopropylamine. Mixtures of solvents may be used. Even if the fluxes have no solid components or immiscible liquid components, solvents may be useful to adjust the concentration of active matter in the fluxes and/or to adjust the viscosity. Often it is convenient to use a solvent or solvent mixture in an amount of about 2.5 parts by weight per part by weight of the other components of the composition.

On the basis of the components of the fluxes other than any solvent or solvents present, the fluxes preferably contain at least 20% by weight, more preferably at least 30% by weight, of a Versatic acid and at least 10% by weight, more preferably at least 15% by weight, of one of the dimerised or trimerised acids. These percentages apply correspondingly where part or all of the Versatic acid and/or of the dimerised and/or trimerised acids are replaced by the alternative components mentioned. Commonly, based on the total weight of Versatic acid or alternative and dimerised and/or trimerised acid or alternative, there will be 25 – 75%, preferably 40 – 50%, of the former and a corresponding percentage of the latter.

The precise reasons why the fluxes are so satisfactory are not known but it is thought that the Versatic acid and/or alternative component, which is relatively reactive as a flux, exerts a very rapid initial fluxing action and that the dimerised and/or trimerised acid and/or alternative component, which is less reactive, provides a more sustained fluxing action which enables the soldering to be completed satisfactorily. The Versatic acid or alternative is relatively volatile (more so than the dimerised or trimerised acid or alternative) and thus the tendency for any excess to remain at the end of the soldering operation is negligible. By use of the various active components fluxes each having a graded spectrum of activities can be made and thus, in soldering, a desirably high speed of wetting can be achieved with a desirably high degree of wetting. The dimerised and/or trimerised acid and alternative components are of relatively high thermal stability and thus are generally available to perform fluxing functions until completion of soldering. The dimerised or trimerised acid or alternative tends eventually to decompose rather than volatilise and the decomposition and reaction products are harmless and readily removed together with any excess after soldering. Any excess flux remaining, e.g. after soldering a seam, is normally removed and this can easily be done by wiping.

The fluxes have the advantages the despite their effectiveness in soldering tin plate they do not tend to leave corrosive residues and they do not have any significant corrosive effect on steel equipment used in can-making. Furthermore, the fluxes containing the dimerised and/or trimerised acids have a valuable antidross effect on solder and, in can-making where a certain amount of the flux tends to find its way back to the solder bath, this is a desirable incidental property. In can-making a certain amount of zinc chloride is normally added to the solder bath as an anti-dross agent and when fluxes according to the invention are used a smaller amount of zinc chloride can be added. Also, feed back of the flux to the solder bath helps to minimise the emission of corrosive and unpleasant halide vapours derived from zinc chloride in the solder bath.

The fluxes according to the invention are most satisfactory when used at soldering temperatures of 300°C or more e.g. up to 400°C but may be used satisfactorily at temperatures as low as, for example, 250°C. Thus, the fluxes are of use with soft solders in general.

The following are examples of fluxes according to the invention.

| Example 1 | |
|---|---|
| Versatic acid 911 | 55 parts by weight |
| Dimerised oleic acid, Empol 1022 | 45 parts by weight |
| Example 2 | |
| Butyl acid phosphate | 33 parts by weight |
| Versatic acid 911 | 33 parts by weight |
| Dimerised oleic acid, Empol 1022 | 33 parts by weight |
| Example 3 | |
| Versatic acid 911 | 3 parts by weight |
| Azelaic acid | 2 parts by weight |
| Dimerised oleic acid, Empol 1022 | 1 part by weight |
| Isopropyl alcohol (as solvent) | 4 parts by weight |
| Monoisopropylamine (as solvent) | 2 parts by weight |
| Example 4 | |
| Versatic acid 911 | 20 parts by weight |
| Butyl acid phosphate | 40 parts by weight |
| Dimerised oleic acid | 40 parts by weight |

The fluxes of the above Examples were made simply by mixing the components together. All the fluxes were very satisfactory for use in soldering tin plate using soft solders such as tin/lead solders at temperatures in the range of 250° to 400°C. The fluxes are suitable not only for use with good quality tin plate in good condition but also with tin plate of less good quality or in poor condition or both. Example 3 exemplifies fluxes containing in aliphatic or alicyclic dicarboxylic acid or half-ester thereof in an amount of up to 100% by weight (50% in this Example) of the total weight of the essential components one and two. Example 3 also exemplifies the use of a solvent or solvents in amounts up to 90% by weight of the total flux (50% in this Example).

What is claimed is:

1. A method of soldering tin plate in which as the soldering flux is used a flux comprising at least one compound selected from the group consisting of dimerised and trimerised unsaturated aliphatic monocarboxylic acids having at least 10 carbon atoms.

2. A method according to claim 1 in which as the soldering flux is used a flux comprising, in free acid or ammonium or amine salt form, (1) at least one compound selected from the group consisting of $C_{7-11}$ aliphatic monocarboxylic acids and acid organic phosphates and (2) at least one substance selected from the group consisting of dimerised and trimerised unsaturated aliphatic monocarboxylic acids having at least 10 carbon atoms.

3. A method according to claim 2 in which component (1) of the flux comprises a $C_{7-11}$ aliphatic monocarboxylic acid and component (2) comprises at least one compound selected from the group consisting of dimerised and trimerised unsaturated aliphatic monocarboxylic acids having at least 10 carbon atoms.

4. A method according to claim 1 wherein the soldering is carried out at a temperature within the range of 250° to 400°C.

5. A method of soldering tin plate in which as the soldering flux is used a flux comprising, in free acid or ammonium or amine salt form, (1) at least one acid organic phosphate and (2) at least one saturated $C_{12-36}$ aliphatic monocarboxylic acid.

* * * * *